R. ADNSON.
PROPELLER FOR BOATS.
APPLICATION FILED MAR. 3, 1908.
902,362.  Patented Oct. 27, 1908.
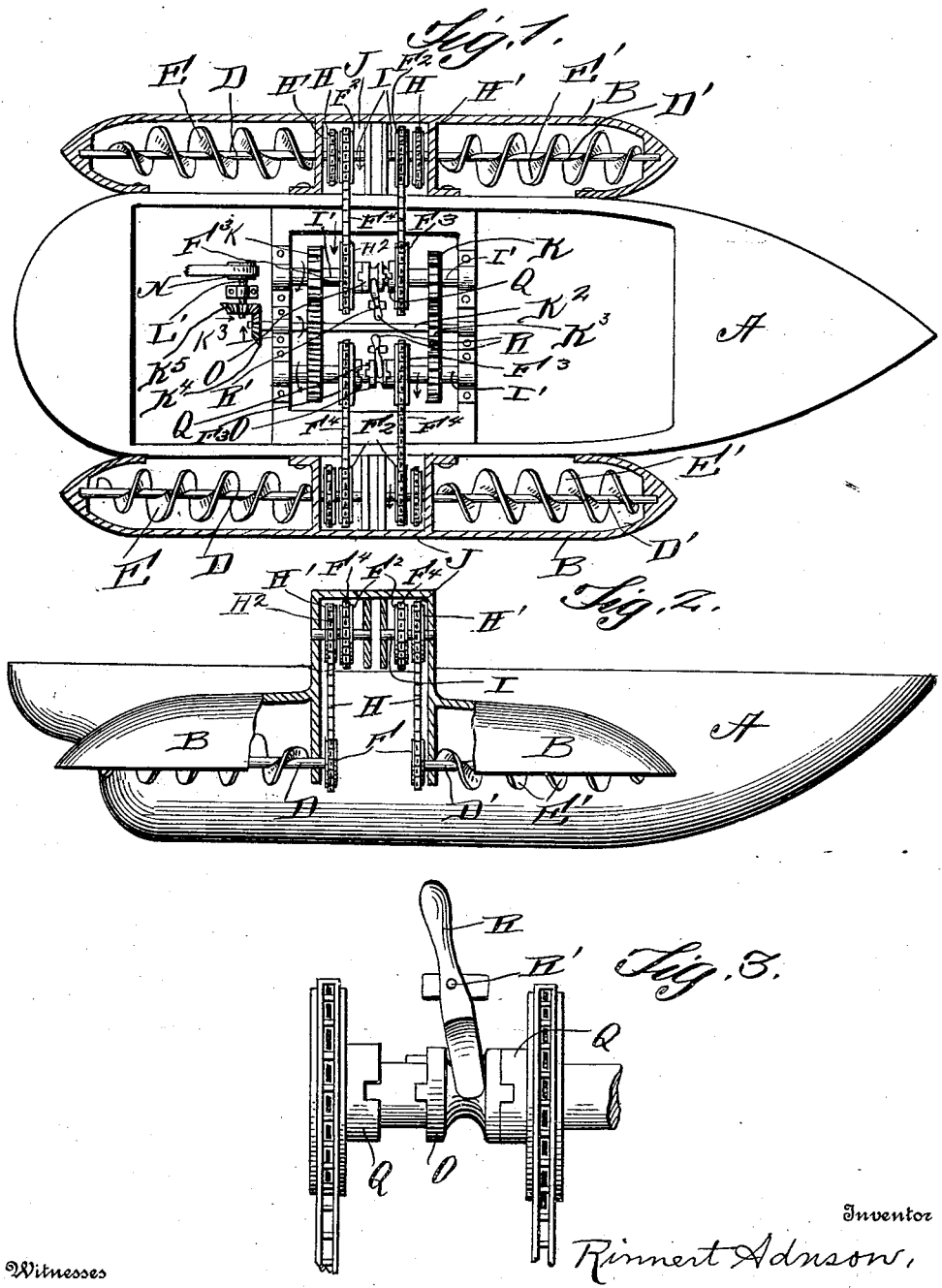

UNITED STATES PATENT OFFICE.

RINNERT ADNSON, OF CLEGHORN, IOWA.

PROPELLER FOR BOATS.

No. 902,362.  Specification of Letters Patent.  Patented Oct. 27, 1908.

Application filed March 3, 1908. Serial No. 419,003.

*To all whom it may concern:*

Be it known that I, RINNERT ADNSON, a citizen of the United States, residing at Cleghorn, in the county of Cherokee and State of Iowa, have invented certain new and useful Improvements in Propellers for Boats; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in propellers for boats, and comprises various details of construction, combinations and arrangements of parts which will be hereinafter fully described and then specifically defined in the appended claims.

My invention is illustrated in the accompanying drawings, in which:—

Figure 1 is a top plan view of the apparatus. Fig. 2 is a side elevation, a portion being illustrated in vertical section, and Fig. 3 is an enlarged detail view of the clutch mechanism for reversing the movement of the boat.

Reference now being had to the details of the drawings by letter, A designates the hull of a boat having upon opposite sides thereof the elongated troughs or passageways B, the opposite ends of which are tapered in order to offer as little resistance to the water as possible, and the upper surface of said passageways or troughs is convexed preferably, as shown clearly in Fig. 2 of the drawings. Mounted in suitable bearings in each of said passageways or troughs is a shaft D having a spiral blade E thereon, and D' designates similar shafts which are also mounted in said same troughs as the shafts D and each is provided with a spiral blade E' similar to the blade E but reversed. Fixed to the inner end of each of said shafts is a sprocket wheel F shown in Fig. 2, and H designates a sprocket chain passing about the sprocket wheel F and also a sprocket wheel H' mounted upon a shaft I journaled in suitable bearings in the housing J positioned above the inner ends of said shafts.

It will be noted upon reference to Figs. 1 and 2 of the drawings that there are two of the shafts I similarly constructed mounted in alinement with each other on each side of the boat. A sprocket wheel $F^2$ is fixed to each shaft I, and I'—I' designate shafts which are journaled in suitable bearings in the portion of the boat intermediate the passageways B, and loosely mounted upon each shaft I' is a sprocket wheel $F^3$ and sprocket chains $F^4$ pass about a sprocket wheel $F^2$ and also a sprocket wheel $F^3$, as shown clearly in Fig. 1 of the drawings. A shaft $K^2$ is journaled in suitable bearings intermediate the shafts I' and has pinion wheels $K^3$ fixed thereto which are adapted to mesh with the pinion K upon the shafts I' and a bevel pinion $K^4$ is fixed to the end of the shaft $K^2$ and meshes with a bevel pinion $K^5$ upon the shaft L' which is driven by belted connection with the pulley N, shown in Fig. 1 of the drawings.

A clutch collar O is splined to each shaft I and R is a pivotal lever adapted to engage a groove in the clutch collar O, there being one of said levers to each clutch collar, as shown clearly in Fig. 1 of the drawings and also clearly shown in Fig. 3. The clutch collar is designed to be thrown into engagement with one or the other of the adjacent collars Q integral with a sprocket wheel $F^3$, accordingly as it may be desired to cause one or the other of the propeller shafts upon the side of the boat to rotate in one direction or the other as may be desired to cause the boat to be driven forward or rearward. A clutch operating lever R is pivotally mounted upon a pin R' and engages a groove in the collar O whereby, as the lever is rocked upon its pivot, the clutch collar may be moved back and forth upon the shaft I.

From the foregoing, it will be noted that, by the provision of the propelling apparatus as shown and described, a simple and efficient means is afforded whereby a continuous movement may be imparted to one set of shafts D or the other D' accordingly as it may be desired to cause the boat to move forward or rearward. Owing to the particular construction of the coverings or roofings of the passageways in which the propeller shafts are mounted, slight resistance is offered to the water as the boat is driven through the same.

What I claim to be new is:—

1. A propelling apparatus for boats comprising, in combination with a hull, longitudinal passageways along the opposite sides of the boat, said passageways tapering at their ends, propeller shafts journaled in each passageway, sprocket wheels fixed to the inner ends of said propeller shafts, housings over said sprocket wheels, shafts journaled in said housings, sprocket chains connecting the said shafts in the housings with said sprocket wheels upon the propelling shafts, and clutch mechanism for causing said propeller shafts to rotate, as set forth.

2. A propelling apparatus for boats comprising a hull having two passageways parallel to each other upon the opposite sides of the boat, the upper surfaces of said passageways being inclined toward the ends thereof, said passageways provided with vertical partitions which project above the passageways and form housings, propeller shafts journaled at their inner ends within said passageways, shafts journaled in the housings, sprocket wheel and chain connections between said shafts in the housings and said propeller shafts, clutch collars, and means for throwing the same into gear connection with one or another of the propeller shafts, as set forth.

In testimony whereof I hereunto affix my signature in the presence of two witnesses.

RINNERT ADNSON.

Witnesses:
D. H. EHLER,
ROBT. SNYDER.